(12) United States Patent
Choi (10) Patent No.: US 7,579,101 B2
(45) Date of Patent: Aug. 25, 2009

(54) DIRECT LIQUID FEED FUEL CELL STACK

(75) Inventor: Kyoung-hwan Choi, Gyeonggi-do (KR)

(73) Assignee: Samsung SDI Co., Ltd., Suwon-si (KR)

( * ) Notice: Subject to any disclaimer, the term of this patent is extended or adjusted under 35 U.S.C. 154(b) by 886 days.

(21) Appl. No.: 10/915,567

(22) Filed: Aug. 11, 2004

(65) Prior Publication Data
US 2005/0074652 A1 Apr. 7, 2005

(30) Foreign Application Priority Data
Oct. 1, 2003 (KR) .......................... 2003-0068322

(51) Int. Cl.
H01M 2/08 (2006.01)
H01M 2/00 (2006.01)
H01M 2/02 (2006.01)
H01M 2/14 (2006.01)

(52) U.S. Cl. .............. 429/35; 429/34; 429/38; 429/39

(58) Field of Classification Search ............... 429/12–46
See application file for complete search history.

(56) References Cited

U.S. PATENT DOCUMENTS

| 6,080,503 A | 6/2000 | Schmid et al. | |
|---|---|---|---|
| 6,864,004 B2 * | 3/2005 | Wilson et al. | 429/32 |
| 2004/0191409 A1 | 9/2004 | Machida et al. | |

FOREIGN PATENT DOCUMENTS

| CA | 2 451 096 | 1/2003 |
|---|---|---|
| DE | 197 18 970 | 11/1998 |
| JP | 62-136777 | 6/1987 |
| JP | 7-226220 | 8/1995 |
| JP | 2002-83614 | 3/2002 |
| JP | 2002-313360 | 10/2002 |
| JP | 2002-313371 | 10/2002 |
| JP | 2003-17093 | 1/2003 |
| JP | 2003-157867 | 5/2003 |
| JP | 2003-197249 | 7/2003 |
| WO | WO 98/50975 | 11/1998 |
| WO | WO 03/026049 | 3/2003 |
| WO | WO 03/092096 | * 11/2003 |

OTHER PUBLICATIONS

Office Action issued on Mar. 6, 2007 by the Japanese Patent Office for Japanese Patent Application No. 2004-290367.
Search Report issued in European Application No. 04252702.8-2119 on Jun. 30, 2006.
Office Action issued in Chinese Patent Application No. 2004100384417 on Aug. 11, 2006.

* cited by examiner

*Primary Examiner*—Dah-Wei D Yuan
*Assistant Examiner*—Steven Scully
(74) *Attorney, Agent, or Firm*—Stein McEwen, LLP

(57) ABSTRACT

A direct liquid feed fuel cell stack that includes Membrane Electrode Assemblies (MEAs) and bipolar plates. Each MEA includes an electrolyte membrane, an anode and a cathode, and the MEA is interposed between stacked bipolar plates. Each bipolar plate includes a groove with a predetermined depth enclosing an electrode region on each face of the bipolar plate, and a plurality of fuel flow holes in the electrode region to supply fuel or oxidant to a corresponding fuel channel, with a sealing member being formed on the groove. The direct liquid feed fuel cell stack prevents fuel leakage and useless fuel consumption, thereby providing longer hours of operation.

19 Claims, 8 Drawing Sheets

DIRECT LIQUID FEED FUEL CELL STACK

CROSS-REFERENCE TO RELATED APPLICATIONS

This application claims the priority benefit of Korean Patent Application No. 2003-68322 filed on Oct. 1, 2003 in the Korean Intellectual Property Office, the disclosure of which is incorporated herein in its entirety by reference.

BACKGROUND OF THE INVENTION

1. Field of the Invention

The present invention relates to a direct liquid feed fuel cell stack and method, and more particularly, to a sealing structure between bipolar plates and an MEA (Membrane Electrode Assembly) included in a Direct Methanol Fuel Cell.

2. Description of the Related Art

A Direct Methanol Fuel Cell (DMFC) is a device for producing electricity. The DMFC has high energy density and power density by an electro-chemical reaction between an organic compound fuel such as methanol or ethanol and an oxidant, e.g., oxygen. Because it directly uses a liquid fuel, the DMFC does not require peripheral devices such as a fuel reformer, and has the advantages of easy storing and instant supplying of the liquid fuel.

Figure 1:
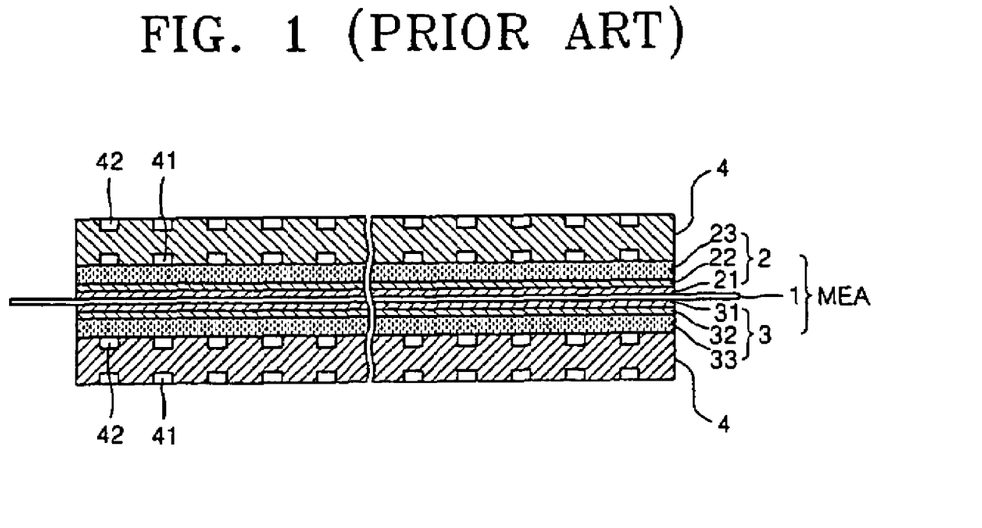
FIG. 1 is a cross-sectional illustration of a single cell in a direct liquid feed fuel cell.

As depicted in FIG. 1, a single cell of the DMFC includes a membrane electrode assembly (MEA) having an electrolyte membrane 1 between an anode 2 and a cathode 3. The anode 2 and the cathode 3 include fuel diffusion layers 22 and 32 for fuel supply and diffusion, catalyst layers 21 and 31 for oxidation and reduction reactions of the fuel, and electrode supporting layers 23 and 33, respectively. A catalyst formed of a precious metal having a superior catalytic characteristic at a low temperature, e.g., platinum, is used for an electrode reaction. Alternatively, in order to avoid catalyst poisoning by a by-product of the reaction, e.g., CO, an alloyed catalyst containing a transition metal such as ruthenium, rhodium, osmium, or nickel is used. A wet-proof carbon paper or a carbon cloth for easy fuel supply and discharge of the reaction products is used for an electrode supporting layer. An electrolyte membrane is a polymer membrane having a thickness in a range of 50~200 μm. A proton exchange membrane with ionic conductivity may be used as the electrolyte membrane.

The electrochemical reaction in the DMFC, which uses a mixture of methanol and water as fuel, includes an anode reaction where the fuel is oxidized and a cathode reaction where oxygen is reduced.

Each reaction can be described as:

(Reaction 1—Anode reaction)

(Reaction 2—Cathode reaction)

(Reaction 3—Overall reaction)

At the anode 2 where an oxidation reaction (reaction 1) occurs, one carbon dioxide, six protons, and six electrons are produced. Produced protons move to the cathode 3 through a proton exchange membrane 1. At the cathode 3 where a reduction reaction (reaction 2) takes place, water is produced by the reduction reaction between protons, electrons transferred from an external circuit, and oxygen. Accordingly, as the result of an overall reaction (reaction 3), water and carbon dioxide are produced from the reaction between methanol and oxygen.

A theoretical voltage from a single cell of a DMFC is approximately 1.2 V. However, an open circuit voltage at ambient temperature and atmospheric pressure falls below 1.0 V, due to a voltage drop caused by an activation overvoltage and a resistance overvoltage. In reality, an actual operating voltage lies in the range of 0.4~0.6 V. Therefore, to obtain higher voltages, a plurality of single cells, connected in series, are required.

A fuel cell stack is formed by stacking several single cells, connected in series. Adjacent single cells are electrically connected to each other by an electric conductive bipolar plate 4 interposed between the single cells.

The bipolar plate 4 can be formed of a graphite block which has high mechanical strength, high electrical conductivity, and good machining property. A block of composite material, containing a metal or a polymer, can also be used as the bipolar plate 4.

Fuel flow channels 41 and 42 are formed on both faces of the bipolar plate: channels 41 supply fuel, e.g., methanol on one face contacting the anode 2, and flow channels 42 supply air on the opposite face contacting the cathode 3. A bipolar plate 4 interposed between the fuel cell stack has a channel for supplying fuel on one face and a channel for supplying air on an opposite face. At the top and bottom of the fuel cell stack, end plates (not shown), e.g., monopolar plates, are placed. Thus, flow channels 41 and 42 supply fuel or air to an adjacent single cell formed on the end plate.

Figure 2:
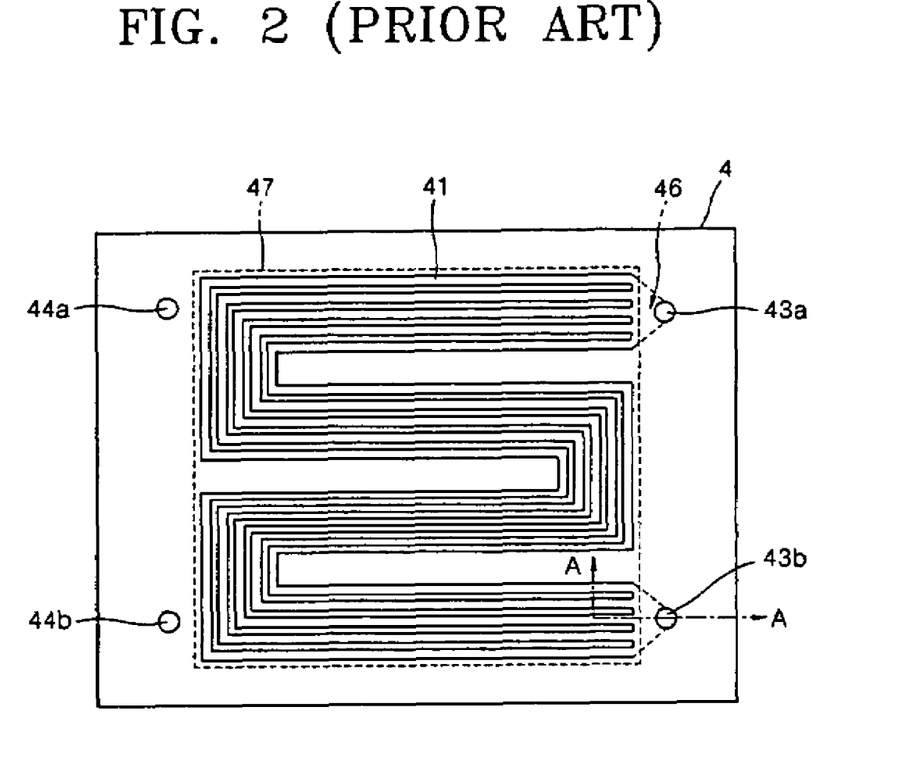
FIG. 2 illustrates a conventional bipolar plate.
Figure 3:
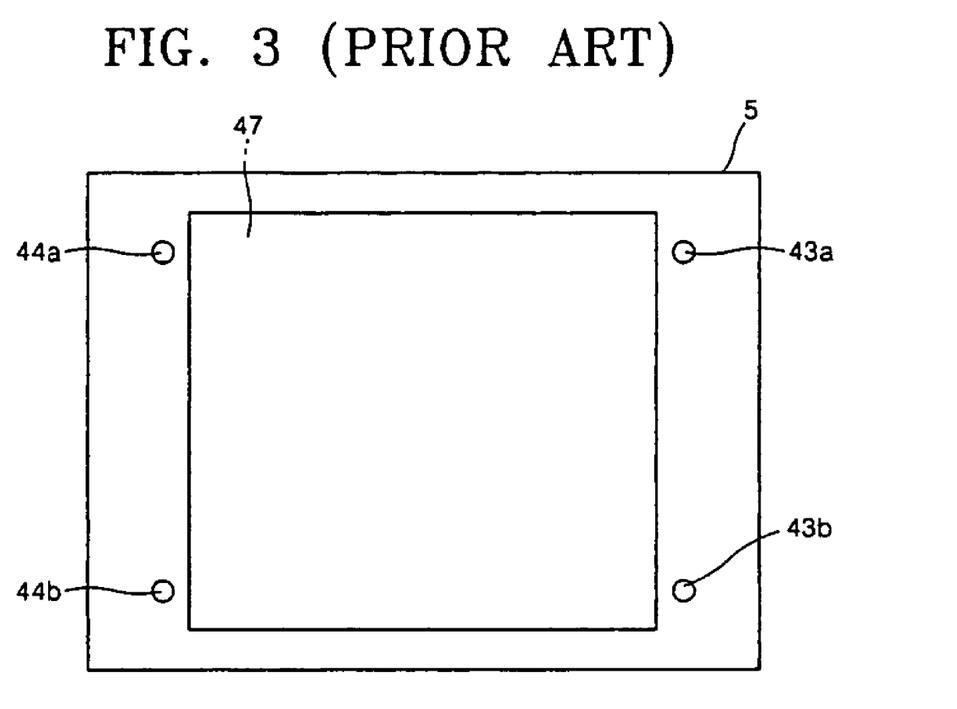
FIG. 3 illustrates a gasket attached to a surface of the bipolar plate depicted in FIG. 2.

FIG. 2 illustrates a surface of a conventional bipolar plate having liquid fuel flow channels. FIG. 3 illustrates a gasket 5 attached to the surface of the bipolar plates, depicted in FIG. 2.

Referring to FIG. 2, a plurality of fuel channels 41 having a serpentine shape and openings at their upper surface are formed on an electrode region 47 of a conventional bipolar plate 4, where an MEA will be located. At an outer region of the electrode region 47, manifolds 46 connect to an inlet and an outlet of the fuel channels 41, and fuel flow holes 43a, 43b, 44a, and 44b connect to the manifolds 46 through the bipolar plate 4. The fuel flow holes 43a, 43b, 44a, and 44b include an inlet 43a and an outlet 43b of liquid fuel, and an inlet 44a and outlet 44b of an oxidant. The manifolds 46 connecting the liquid fuel flow holes 43a and 43b to the plurality of fuel channels 41 are formed inside the bipolar plate 4, without being exposed to a surface of the bipolar plate 4.

Referring to FIG. 3, the electrode region 47 and fuel flow holes 43a, 43b, 44a, and 44b, of the bipolar plate 4, are opened in the gasket 5.

Figure 4:
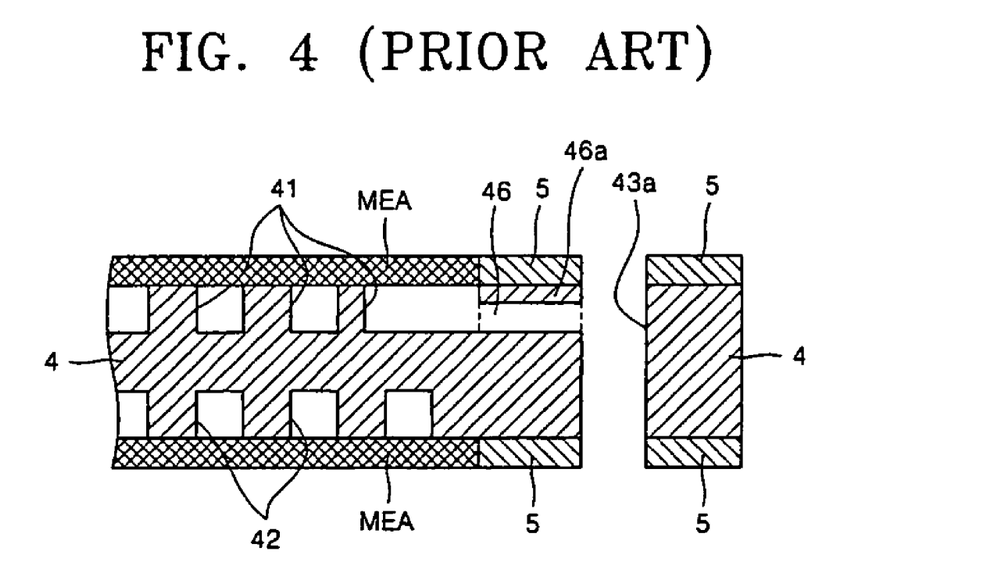
FIG. 4 is a cross-sectional illustration of the conventional bipolar plate taken along a line A-A in FIG. 2.

FIG. 4 is a cross-sectional view of the gasket 5 and an MEA, located on the bipolar plate 4, taken along a line A-A in FIG. 2.

Referring to FIG. 4, the MEA is placed on the fuel channels 41 and 42, i.e., the electrode region, and the gasket 5 covers the rest of the bipolar plate 4, except for the fuel flow holes 43a, 43b, 44a, and 44b. The gasket 5 prevents the leaking in and out of the fuel and air.

The conventional bipolar plate 4, depicted in FIG. 4, has a relatively thick thickness of about 5~10 mm since the manifold 46 is formed inside the bipolar plate 4. Reference numeral 46a refers to a portion of the bipolar plate 4 covering an upper face of the manifold 46.

For a smaller and lighter fuel cell, a thickness of the bipolar plate should be thinner, such as approximately 1~2 mm. Accordingly, the bipolar plate 4, depicted in FIGS. 2 through 4, is not available for use in the smaller and lighter fuel cell. For this reason, a structure exposing the manifolds has been proposed. An example of this structure is described in U.S. Pat. Nos. 6,284,401, 5,879,826, and 6,146,780.

Figure 5:
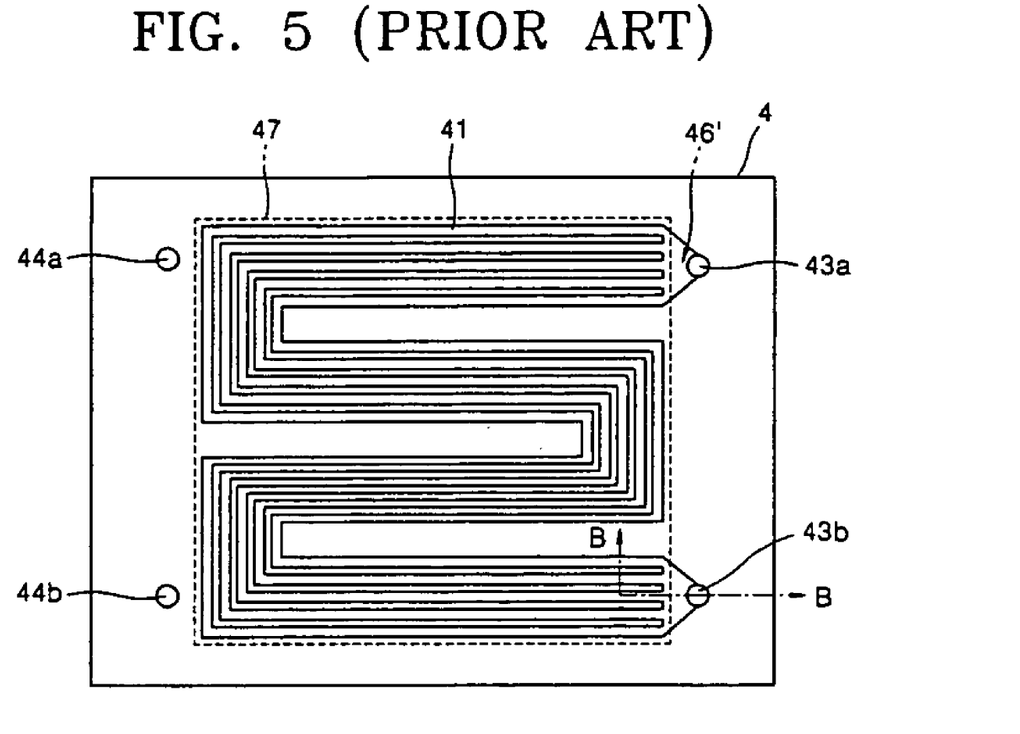
FIG. 5 illustrates a bipolar plate depicted in U.S. Pat. No. 6,284,401.

FIG. 5 schematically illustrates a bipolar plate depicted in U.S. Pat. No. 6,284,401. The same reference numerals are used to refer to like elements in FIGS. 1 through 4, and corresponding detailed descriptions are omitted.

Referring to FIG. 5, a plurality of fuel channels 41, having a serpentine shape and openings at their upper surface, are formed on an electrode region 47, of a bipolar plate 4, where an MEA will be placed. At another region of the electrode region 47, manifolds 46' respectively connect to an inlet and an outlet of the fuel channels 41, and fuel flow holes 43a, 43b, 44a, and 44b connecting to manifolds 46', through the bipolar plate 4, are formed. The fuel flow holes 43a, 43b, 44a, and 44b include an inlet 43a and an outlet 43b of liquid fuel, and an inlet 44a and outlet 44b of an oxidant.

The manifolds 46', connecting the fuel flow holes 43a and 43b to the plurality of fuel channels 41, are formed on the bipolar plate 4, exposed on the surface of the bipolar plate 4.

Figure 6:
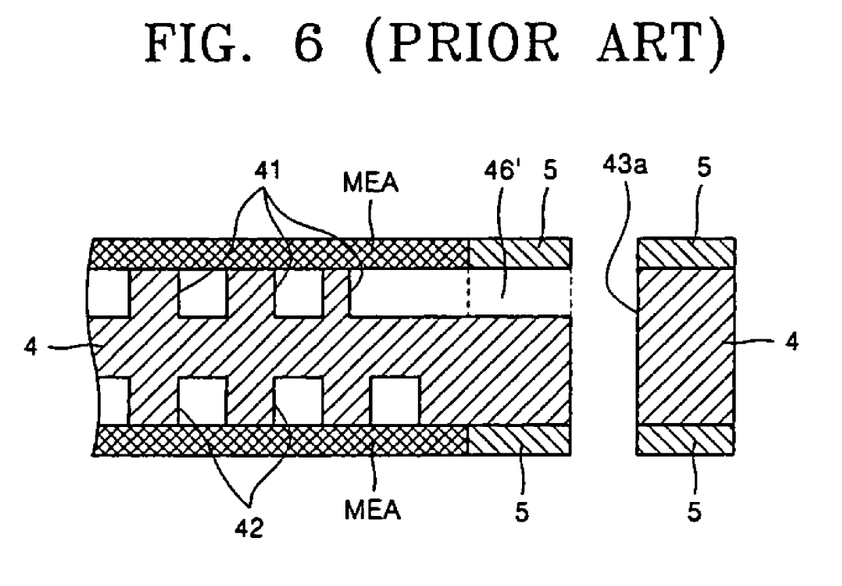
FIG. 6 is a cross-sectional illustration of a bipolar plate including gaskets and MEAs, taken along a line B-B in FIG. 5.

FIG. 6 is a cross-section view of a gasket 5 and an MEA, which are located on the bipolar plate 4, taken along the line B-B in FIG. 5.

Referring to FIG. 6, the MEA is placed on the fuel channels 41 and 42, i.e., on the electrode region 47, illustrated in FIG. 5, with the gasket 5 being located on the rest of the electrode region 47 except for fuel flow holes 43a, 43b, 44a, and 44b. The gasket 5 is also placed on the manifold 46' for preventing fuel leakage.

However, for fabricating a fuel cell stack, the plurality of bipolar plates 4 and a plurality of MEAs become compressed under high pressure. In this case, since the gasket 5, located on the manifold 46', is now unsupported the gasket 5 is prone to bend, which causes leaking of the fuel through an upper part of the gasket 5. As illustrated in FIG. 4, previous methods supported gasket 5 with a portion of the bi-polar plate 4.

In order to solve the bending problem of the gasket 5, a bridge piece can be installed, connecting to the gasket 5 on the manifold 46', reducing a thickness of the bipolar plate 4, as discussed in U.S. Pat. No. 6,410,179.

However, due to the difficulties in manufacturing and installation, and the weak mechanical strength of the bridge piece, fabricating of a fuel cell stack by pressing the gasket and the bipolar plates at a high pressure is not easy or simple. Moreover, this high pressure method is difficult to apply for fabricating a thin bipolar plate having a thickness of 1~2 mm, which is an aim of the present invention.

SUMMARY OF THE INVENTION

The present invention provides a direct liquid feed fuel cell stack that can prevent fuel leakage by forming fuel flow holes in the electrode region of a bipolar plate to cover a manifold region with an electrode.

The present invention also provides a direct liquid feed fuel cell with a sealing member between the fuel flow hole and an MEA by depositing a sealing material in stead of a conventional gasket.

Additional aspects and/or advantages of the invention will be set forth in part in the description which follows and, in part, will be obvious from the description, or may be learned by practice of the invention.

To accomplish the above and/or other aspects and advantages, embodiments of the present invention include a direct liquid feed fuel cell stack, including a plurality of stacked bipolar plates, having membrane electrode assemblies (MEAs) therebetween, wherein each MEA includes an electrolyte membrane, an anode, and a cathode, with the anode and cathode on opposing faces of the electrolyte membrane, wherein at least one of the bipolar plates further includes a groove enclosing an electrode region of the one bipolar plate, where a first MEA is disposed on a face of the one bipolar plate, a fuel flow hole to supply fuel or oxidant to corresponding fuel channels, in the one bipolar plate, at the electrode region of the one bipolar plate, and a sealing member formed on the groove. Further, the sealing member may also be a deposited liquid sealing material.

The fuel flow hole may connect to another fuel flow hole through a plurality of fuel channels, the fuel flow hole and other fuel flow hole may meet fuel channels through corresponding manifolds, and a portion of the corresponding fuel channels and manifolds may be covered by a corresponding anode or cathode.

Further, grooves may be included, proximate to fuel flow holes in the one bi-polar plate not connected to the fuel channels of the one bi-polar plate, and formed on at least one face of the one bipolar plate. Similarly, uppermost and lowermost bipolar plates, of the plurality of bipolar plates, may have fuel flow channels on only one face.

In the direct liquid feed fuel cell stack the first MEA further may include first and second electrode holes and an electrolyte membrane corresponding to fuel flow holes in the one bipolar plate, wherein a diameter of the second electrode hole which does not connect with fuel channels of the one bipolar plate, is larger than a diameter of the corresponding fuel flow hole, and another sealing member is formed on an inner wall of the second electrode hole.

In addition, the other sealing member may be a deposited liquid sealing material, forming a step through a formation of a diameter difference between the second electrode hole and a corresponding electrolyte membrane hole.

The diameter of an electrolyte membrane hole may be bigger than a diameter of a corresponding fuel flow hole, wherein the other sealing member is formed on an inner wall of the second electrode hole and the electrolyte membrane hole. Similarly, a diameter of the electrolyte membrane hole may be smaller than the diameter of the second electrode hole.

The other sealing member may be a deposited liquid sealing material, forming a step through a formation of a diameter difference between the second electrode hole, the electrolyte membrane hole, and the first electrode hole. Likewise, the first MEA may have a plurality of MEA holes corresponding to fuel flow holes in the one bipolar plate, with a diameter of one of the MEA holes is bigger than one of the fuel flow holes of the bipolar plate, and another sealing member is placed on a portion of an inner wall of the one MEA hole. As above, the other sealing member may be formed by depositing a liquid sealing material.

To accomplish the above and/or other aspects and advantages, embodiments of the present invention include a direct liquid feed fuel cell, including at least one bipolar plate, and at least one electrode assembly (MEA), opposing a side of the one bipolar plate, wherein the one MEA includes an electrolyte membrane, an anode, and a cathode, with the anode and cathode being positioned on opposing faces of the electrolyte membrane, wherein the one bipolar plate further includes a first fuel flow hole to supply fuel or oxidant to a first fuel channel at an electrode region of the one bipolar plate, a first groove proximate to a second fuel flow hole of the bipolar plate not connected to the first fuel channel, and a first sealing member formed in the first groove.

This direct liquid feed fuel cell may further include a second bipolar plate on an opposing side of the one MEA, wherein the second bipolar plate further includes a third fuel flow hole, aligned with the second fuel hole, to supply fuel or oxidant to a second fuel channel at an electrode region of the second bipolar plate, a second groove enclosing a fourth fuel flow hole of the second bipolar plate, aligned with the first fuel hole, and not connected to the second fuel channel, and a second sealing member formed in the second groove.

Similar to above, the one bipolar plate and second bipolar plate may be forcibly stacked by a third sealing member connecting to a third groove in the one bipolar plate enclosing the electrode region of the one bipolar plate and to a fourth groove in the second bipolar plate enclosing the electrode region in the second bipolar plate.

The first groove prevents fuel from the second fuel hole to contact the anode if fuel from the first fuel hole contacts the cathode and prevents fuel from the second fuel hole to contact the cathode if fuel from the first fuel hole contacts the anode.

Accordingly, the one bipolar plate can have a thickness less than approximately 2 mm, and multiple bipolar plates can be forcibly stacked without use of end plates to keep stacked bipolar plates compressed.

To accomplish the above and/or other aspects and advantages, embodiments of the present invention include a direct liquid feed fuel cell method, with the direct liquid feed fuel cell includes at least one bipolar plate and at least one electrode assembly (MEA), opposing a side of the one bipolar plate, wherein the one MEA includes an electrolyte membrane, an anode, and a cathode, with the anode and cathode being positioned on opposing faces of the electrolyte membrane, including supplying fuel or oxidant through a first fuel flow hole to a first fuel channel at an electrode region of the one bipolar plate, and sealing proximate to a second fuel flow hole of the bipolar plate, not connected to the first fuel channel, using a sealant included within a region of the one bipolar plate proximate to the second fuel flow hole.

When a second a second bipolar plate is located on an opposing side of the one MEA, the method further includes supplying fuel or oxidant through a third fuel flow hole, aligned with the second fuel hole, to a second fuel channel at an electrode region of the second bipolar plate, and sealing proximate to fourth fuel flow hole of the second bipolar plate, aligned with the first fuel hole, and not connected to the second fuel channel, using a sealant included within a region of the second bipolar plate proximate to the fourth fuel hole.

Further, the method may include forcibly stacking the one bipolar pate and second bipolar plate by sealing the one bipolar plate, within the one bipolar plate and around the electrode region of the one bipolar plate, with the second bipolar plate, within the second bipolar plate and around the electrode region in the second bipolar plate. In this method, the sealing within the one bipolar plate can be accomplished by placing a sealant within a groove in the one bipolar plate.

To accomplish the above and/or other aspects and advantages, embodiments of the present invention include direct liquid feed fuel cell method, with the direct liquid feed fuel cell includes at least one bipolar plate and at least one electrode assembly (MEA), opposing a side of the one bipolar plate, wherein the one MEA includes an electrolyte membrane, an anode, and a cathode, with the anode and cathode being positioned on opposing faces of the electrolyte membrane, including supplying fuel or oxidant through a first fuel flow hole to a first fuel channel at an electrode region of the one bipolar plate, and forcibly stacking the one bipolar plate and a second bipolar plate by sealing the one bipolar plate, within the one bipolar plate and around the electrode region of the one bipolar plate, with the second bipolar plate, within the second bipolar plate and around an electrode region in the second bipolar plate.

In this method, when a second a second bipolar plate is located on an opposing side of the one MEA, the method further includes supplying fuel or oxidant through a third fuel flow hole, aligned with a second fuel hole of the one bipolar plate which does not connect with the first fuel channel, to a second fuel channel at an electrode region of the second bipolar plate, and sealing proximate to a fourth fuel flow hole of the second bipolar plate, aligned with the first fuel hole, and not connected to the second fuel channel, using a sealant included within a region of the second bipolar plate proximate to the fourth fuel hole.

Again, the sealing within the region of the second bipolar plate can be accomplished by placing a sealant within a groove in the second bipolar plate. Similarly, the sealing within the one bipolar plate can be accomplished by placing a sealant within a groove in the one bipolar plate and a groove within the second bipolar plate.

Lastly, to accomplish the above and/or other aspects and advantages, embodiments of the present invention include a direct liquid feed fuel cell stack, including a plurality of stacked bipolar plates, having membrane electrode assemblies (MEAs) therebetween, wherein each MEA comprises an electrolyte membrane, an anode, and a cathode, with the anode and cathode on opposing faces of the electrolyte membrane, wherein at least one of the bipolar plates includes fuel flow holes, to supply fuel or oxidant to a corresponding fuel channel in the one bipolar plate, positioned within an electrode region of the one bipolar plate.

BRIEF DESCRIPTION OF THE DRAWINGS

These and/or other aspects and advantages of the invention will become apparent and more readily appreciated from the following description of the embodiments taken in conjunction with the accompanying drawings in which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 7:
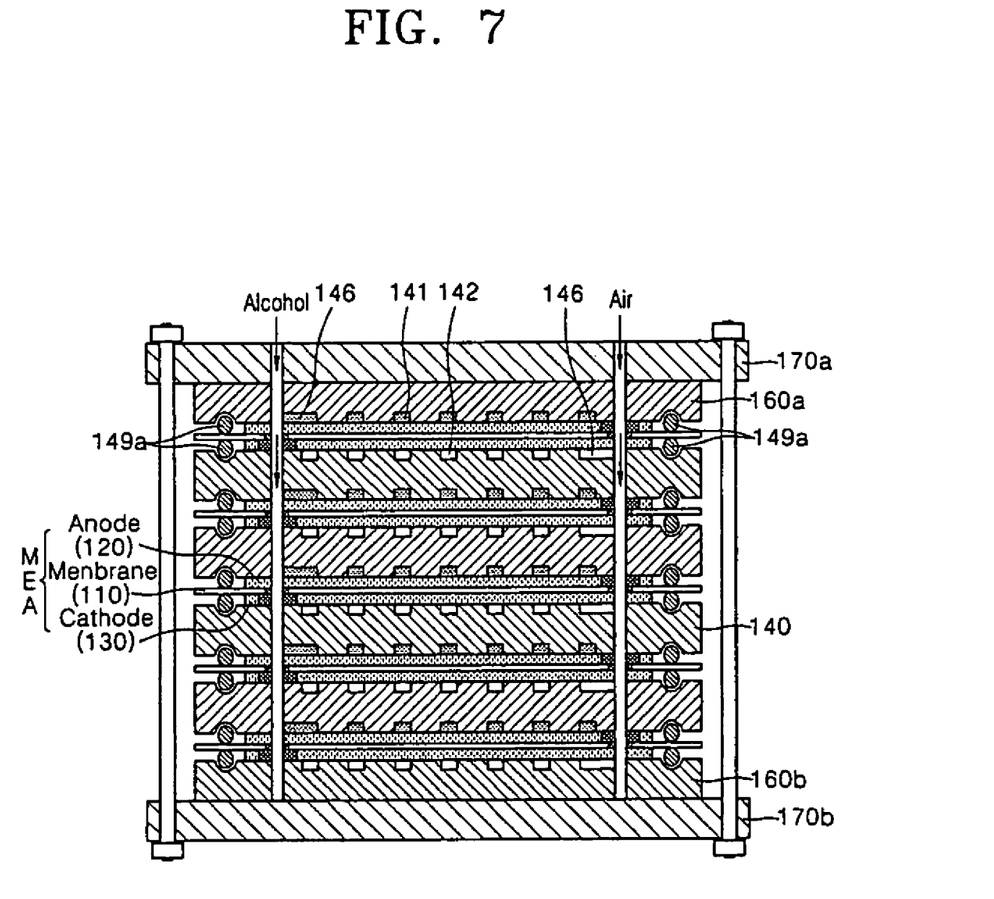
FIG. 7 is a cross-sectional illustration of a fuel cell stack, according to an embodiment of the present invention.

FIG. 7 is a cross-sectional illustration of a fuel cell stack according to an embodiment of the present invention.

Referring to FIG. 7, a plurality of MEAs are stacked in a fuel cell stack, with electric conductive bipolar plates being placed between the MEAs. Each MEA has an electrolyte membrane 110, having an anode on one of its faces and a cathode on the opposite face. Electric conductive end plates 160a and 160b are placed uppermost and lowermost of the fuel cell stack. Only one face of the electric conductive end plates 160a and 160b contacts the MEA, thus this one face of the electric conductive end plates 160a and 160b has the same structure as a face of the bipolar plate 140 and operates in the same manner as the bipolar plate 140. The MEA, the bipolar plates 140 placed between the MEAs, and the conductive end plates 160a and 160b are fixed using fixing end plates 170a and 170b by screw binding.

Figure 8:
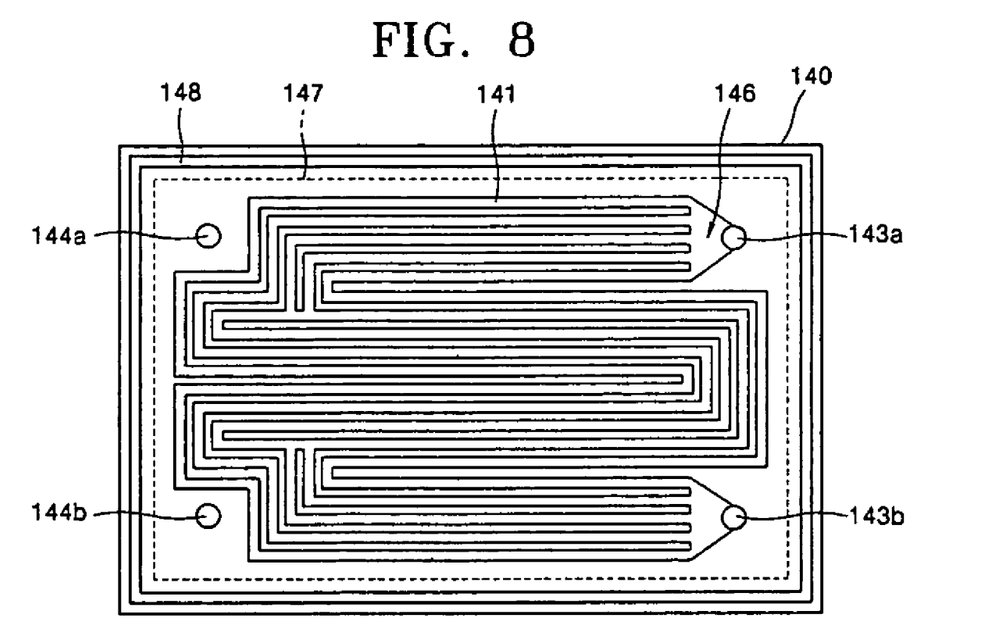
FIG. 8 further illustrates the bipolar plate of FIG. 7.

FIG. 8 illustrates the bipolar plate of FIG. 7. Referring to FIG. 8, a square electrode region 147, where the MEA will be placed, and a groove 148, enclosing the electrode region 147, are formed on the bipolar plate 140. The groove 148 is filled with a sealing material, e.g., liquid silicon, to form a sealing member to seal gaps between the bipolar plates 140.

A plurality of fuel channels 141 having a serpentine shape, with openings at their upper surface being formed with a predetermined depth at the electrode region 147. Also, fuel flow holes 143a and 143b are formed on both ends of the fuel channels 141, through the bipolar plate 140.

Figure 10:
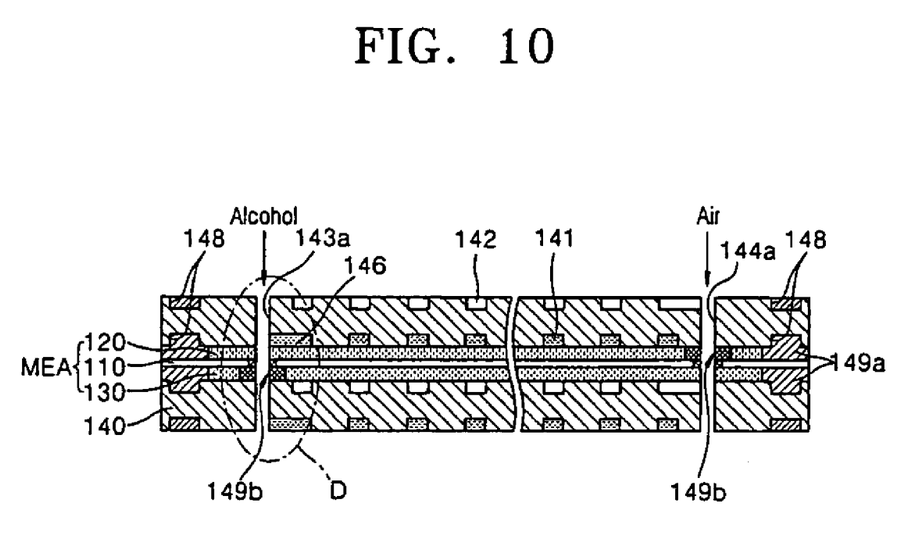
FIG. 10 is a cross-sectional illustration of a single cell, showing a sealing structure from a fuel flow hole to an MEA, of FIG. 7.

Reference numerals 144a and 144b refer to different fuel flow holes, i.e., oxygen inlet holes, which are connected to fuel channels 142, as illustrated in FIG. 10, on the backside of the bipolar plate 140.

Reference numeral 146 can be a conventional manifold connected to the plurality of fuel channels 141, exposed from the face of the bipolar plate 140. The upper face of the manifold 146 and the fuel channel 141 are covered by the MEA when manufacturing a fuel cell stack. That is, the manifold can be formed inside a bipolar plate or covered by a gasket, however, the manifold in this embodiment of the present invention can be covered by an electrode of the MEA. Accordingly, there is an advantage in that the fuel is transferred to the electrode in the electrode region 147, without leaking outside the electrode region 147.

Figure 9:
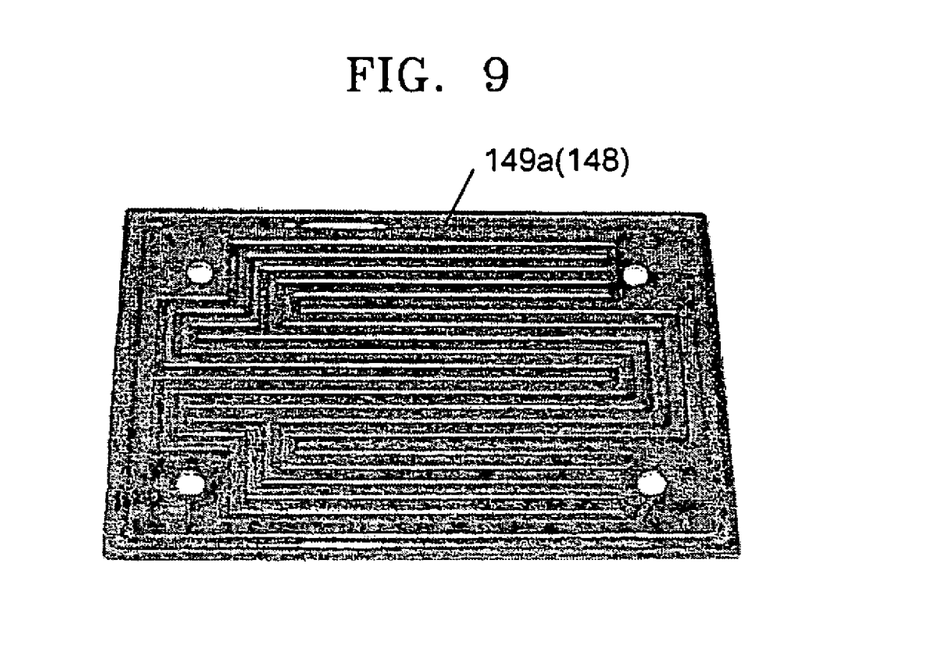
FIG. 9 is a photo of the bipolar plate of FIG. 7.

FIG. 9 is a photo of the bipolar plate of FIG. 7, which illustrates a groove 148 coated with liquid silicon 149a, illustrated in FIG. 7.

Figure 11:
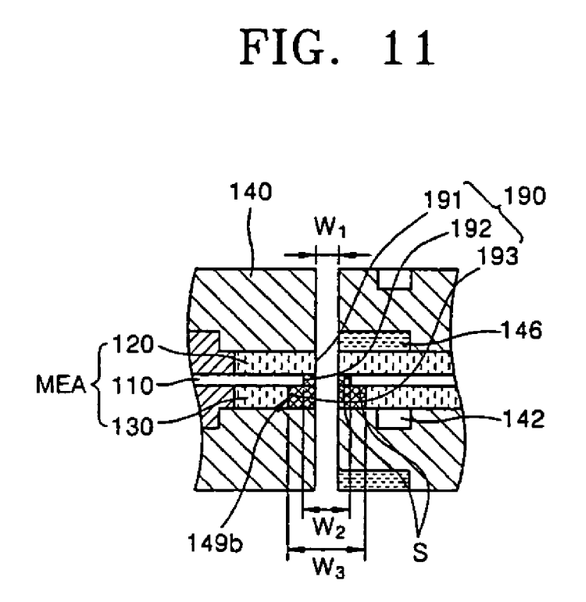
FIG. 11 is a magnified illustration of D of FIG. 10.

FIG. 10 is a cross-sectional illustration of a single cell, illustrating a sealing structure from a fuel flow hole of FIG. 7 to the MEA. FIG. 11 is a magnified illustration of area D of FIG. 10.

Referring to FIGS. 10 and 11, an MEA of a single cell is placed between bipolar plates 140. Fuel channels 141 for supplying liquid fuel are formed on a face connecting to an anode 120, and fuel channels 142 for supplying oxygen are formed on the other face connecting to a cathode 130 of the bipolar plate 140. An electrolyte membrane 110 is interposed between the anode 120 and the cathode 130. These make up the MEA.

Each MEA has holes 190 corresponding to the fuel flow holes 143a, 143b, 144a, and 144b of the bipolar plate 140. Also, holes corresponding to the fuel flow holes 143a, 143b, 144a, and 144b are formed on the anode 120, cathode 130, and the electrolyte membrane 110. Each electrode comprises a corresponding first electrode hole 191 connecting with the respective fuel flow channels 141 and 142 for flowing the liquid fuel or an oxidant, and a second electrode hole 193 not connected to the respective fuel flow channel 141 or 142.

In an embodiment of the present invention, a diameter W1 of the fuel flow hole of the bipolar plate 140 is approximately 3 mm. A diameter of the first electrode hole 191 connecting with the fuel flow hole is approximately 3 mm. A diameter W3 of the second electrode hole 193, corresponding to the first electrode hole 191 and formed on an opposite electrode, is approximately 8 mm. A diameter W2 of the electrolyte membrane 110, formed between the first and the second electrode holes 191 and 193, is approximately 5 mm. Thus, two steps S are formed around the corresponding fuel flow holes for each MEA 190 holes. These steps S are coated with a sealing material, such as silicon glue to form a sealing member 149b. The sealing member 149b seals an inner wall of the fuel flow hole preventing the fuel from penetrating into the second electrode hole 193 and the electrolyte membrane 110. In the case where alcohol fuel is used, the sealing member 149b prevents the alcohol fuel from permeating into the cathode 130, which degrades the performance of the fuel cell, and prevents useless fuel consumption.

Reference numeral 148 is a groove formed in an outer region of the electrode region 147, and reference numeral 149a is similarly the sealing member filling in the groove 148. The sealing member, having a thickness of approximately 1 mm, not only seals the bipolar plate 140, but also attaches the bipolar plates 140 to one another. Therefore, according to this embodiment, a fuel cell stack can be fabricated using a sealing member having a large adhesive force without requiring the use of the conventional end plates 170a and 170b.

Figure 12:
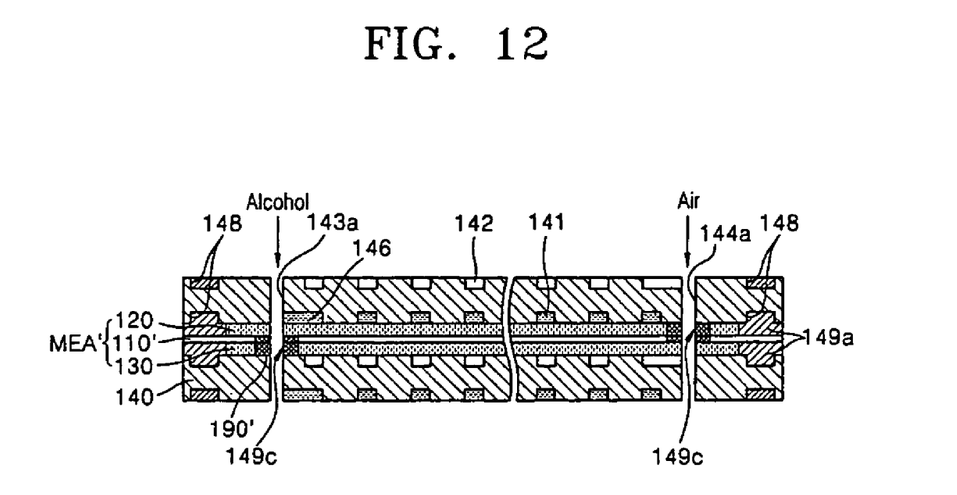
FIG. 12 is a cross-sectional illustration of a single cell according to another embodiment, showing a sealing structure from the fuel flow hole to the MEA of FIG. 10.

FIG. 12 is a cross-sectional illustration of a sealing structure from the fuel flow hole 143a of FIG. 10 to the MEA, according to another embodiment of the present invention. Elements identical to those of FIGS. 10 and 11 are indicated using the same reference numerals.

Referring to FIG. 12, an MEA' of a single cell is placed between the bipolar plates 140. An electrolyte membrane 110' is interposed between an anode 120' and a cathode 130' making up the MEA'.

Fuel flow holes are formed at each bipolar plate 140 and the MEA'. In this embodiment, a diameter of the fuel flow hole of the bipolar plate 140 can be approximately 3 mm, and a diameter of the corresponding holes 190' of the MEA' can be approximately 8 mm. An inner wall of the MEA' hole can be coated with a sealing member 149c, such as silicon glue, to prevent alcohol fuel from leaking into the electrolyte membrane 110' and onto the cathode 130. Thus, performance degradation and useless consumption of fuel can be prevented. To deposit the sealing member 149c, firstly, a liquid sealing material is deposited round the fuel flow holes of a bipolar plate 140 using an automatic dispenser. Next, MEA' and the bipolar plate 140 are assembled by disposing the liquid sealing material inside an inner surface of a fuel flow hole of MEA'.

Figure 13:
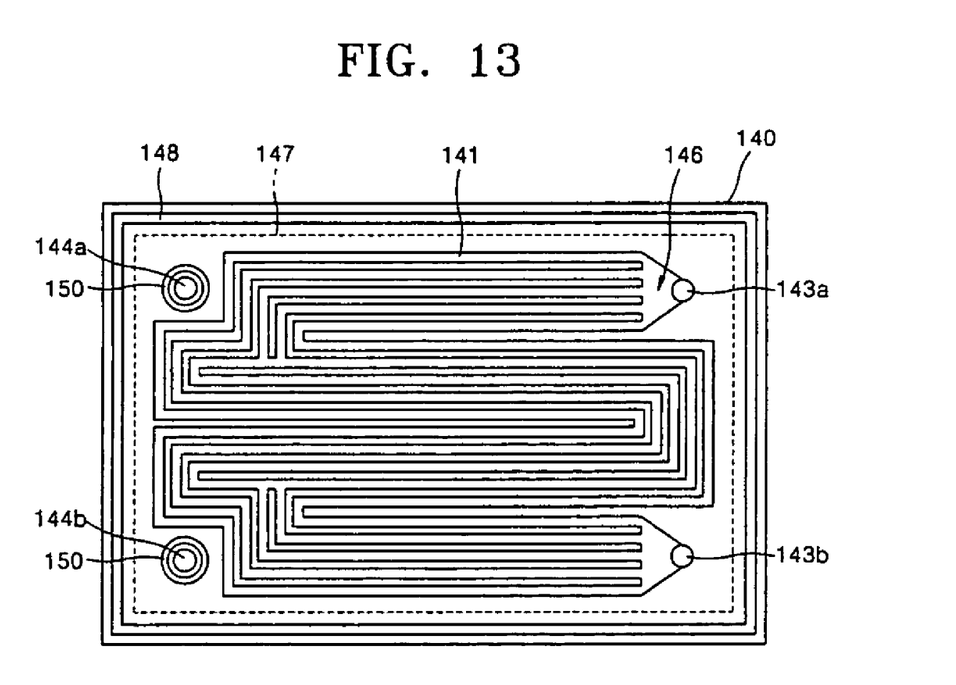
FIG. 13 illustrates a bipolar plate, according to another embodiment of the present invention.

FIG. 13 is a plan view of a bipolar plate 140, according to another embodiment of the present invention. In FIG. 13, the reference numerals are the same reference numerals as those used in FIG. 8.

Referring to FIG. 13, a rectangular electrode region 147, where the MEA will be placed, and a groove 148, enclosing the electrode region 147, are formed on the bipolar plate 140.

A plurality of fuel channels 141, having a serpentine shape exposed from a surface of the bipolar plate 140, are formed with a predetermined depth at the electrode region 147. Also, fuel flow holes 143a and 143b are formed on both ends of the fuel channels 141 through the bipolar plate 140.

Grooves 150 with a predetermined depth are formed around the fuel flow holes 144a and 144b, apart from the fuel channels 141, on the part of the bipolar plate 140. These grooves 150 are coated with a sealing member to prevent the fuel flow holes 144a and 144b from mixing with other fuel.

The following is another embodiment of the present invention. In this embodiment, a polymer impregnated graphite block having dimensions of 75 mm width (W)×50 mm length (L)×1 mm depth (D) can be prepared. Fuel channels are formed on both faces of the block, and fuel flow holes, connecting to the fuel channel, are formed perforating the block, as illustrated in FIG. 8. A groove enclosing the rectangular electrode region is formed, and then the groove is coated with liquid silicon using an automatic dispenser. FIG. 9 is a photo of a bipolar plate manufactured in this way.

Fuel holes 143a, 143b, 144a, and 144b are perforated on an electrolyte membrane 110, having a thickness of 120 μm, and an anode and a cathode, each having a thickness of 250 μm. A diameter of the fuel hole 192 of the electrolyte membrane 110 is 5 mm, a diameter of the hole of a first electrode hole 191, where fuel is supplied from the fuel flow holes 143a and 143b, is 3 mm, and a diameter of the hole of a second hole 193, where fuel is not supplied from the fuel flow holes 143a and 143b, is 8 mm. An assembly of the electrodes 120 and 130 and the electrolyte membrane 110 are formed vertically, aligning the fuel flow holes 143a, 143b, 144a, and 144b. An MEA is then fabricated by hot pressing the assembly.

Figure 14:
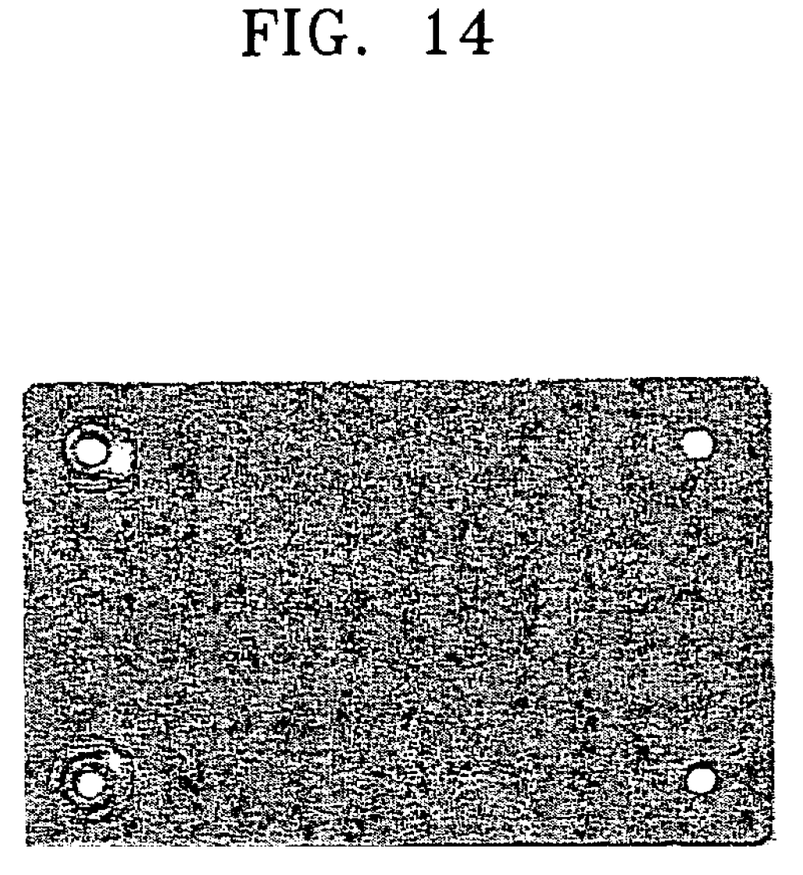
FIG. 14 is a photo of an MEA coated with liquid silicon around fuel flow holes.

Next, surrounding the two fuel flow holes of the MEA, liquid silicon is deposited on inner surfaces of the electrolyte membrane hole having the diameter of 5 mm and the second electrode having the diameter of 8 mm, using an automatic dispenser. FIG. 14 is a photo of the MEA coated around fuel flow holes with liquid silicon. Each MEA coated with liquid silicon around the fuel flow holes is inserted between thirteen bipolar plates in which the groove 148 is coated with liquid silicon, as illustrated in FIG. 12. Afterward, end plates 170a and 170b, larger than the bipolar plates 140, are placed on and under the stack, as illustrated in FIG. 7. Finally, a fuel cell stack is manufactured by compressing the stack using screws.

In this embodiment, a sealing test of the manufactured fuel cell stack was performed by pumping methanol at 1.5 bar, through the fuel supply hole, and air at 1.5 bar, through the air supply hole, without leakage being observed.

A direct liquid feed fuel cell stack, according to embodiments of the present invention, has no fuel leakage problem because fuel flow holes are located in an electrode region and the manifold regions, between the fuel flow holes to the fuel channels, are covered by an electrode, resulting in there being no useless fuel consumption. Thus, a thin fuel cell stack can be manufactured using a bipolar plate having a thickness of 1~2 mm.

Although a majority of the aforementioned embodiments have been set forth with language consistent with an physical device, the present application similarly encompasses methods and processes implementing the underlying invention thereof.

Thus, while this invention has been particularly shown and described with reference to preferred embodiments thereof, it will be understood by those skilled in the art that various changes in form and details may be made therein without departing from the spirit and scope of the invention as defined by the claims and their equivalents.

What is claimed is:

1. A direct liquid feed fuel cell stack, comprising:
   a plurality of stacked bipolar plates, having membrane electrode assemblies (MEAs) therebetween, wherein each MEA comprises an electrolyte membrane, an anode, and a cathode, with the anode and cathode on opposing faces of the electrolyte membrane, wherein at least one of the bipolar plates further comprises:
   a groove enclosing an electrode region of the one bipolar plate, where a first MEA is disposed on a face of the one bipolar plate;
   a first sealing member formed in the groove; and
   a fuel flow hole to supply fuel or oxidant to corresponding fuel channels, in the one bipolar plate, at an electrode region of the one bipolar plate; wherein
   the fuel flow hole connects to another fuel flow hole through the corresponding fuel channels,
   the fuel flow hole and the another fuel flow hole connect to the corresponding fuel channels through corresponding manifolds, and
   the corresponding fuel channels and manifolds are covered by a corresponding anode or cathode,
   wherein the first MEA further comprises a first electrode hole, a second electrode hole and an electrolyte membrane hole corresponding to one of the fuel flow holes in the one bipolar plate,
   wherein a diameter of the second electrode hole, which does not connect with fuel channels of the one bipolar plate, is larger than a diameter of the corresponding fuel flow hole,
   wherein a second sealing member is formed on an inner wall of the second electrode hole, and
   wherein a sealing member is not formed on an inner wall of the first electrode hole.

2. The direct liquid feed fuel cell stack of claim 1, wherein the first sealing member is a deposited liquid sealing material.

3. The direct liquid feed fuel cell stack of claim 1, further comprising grooves, proximate to fuel flow holes, in the one bipolar plate, not connected to the fuel channels of the one bipolar plate, and formed on at least one face of the one bipolar plate.

4. The direct liquid feed fuel cell stack of claim 1, wherein uppermost and lowermost bipolar plates, of the plurality of bipolar plates, have fuel flow channels on only one face.

5. The direct liquid feed fuel cell stack of claim 1, wherein the second sealing member is a deposited liquid sealing material, forming a step through a formation of a diameter difference between the second electrode hole and a corresponding electrolyte membrane hole.

6. The direct liquid feed fuel cell stack of claim 1, wherein a diameter of an electrolyte membrane hole is bigger than a diameter of a corresponding fuel flow hole, wherein the second sealing member is formed on an inner wall of the second electrode hole and the electrolyte membrane hole.

7. The direct liquid feed fuel cell stack of claim 6, wherein a diameter of the electrolyte membrane hole is smaller than the diameter of the second electrode hole.

8. The direct liquid feed fuel cell stack of claim 7, wherein the second sealing member is a deposited liquid sealing material, forming a step through a formation of a diameter difference between the second electrode hole, the electrolyte membrane hole, and the first electrode hole.

9. A direct liquid feed fuel cell, comprising:
   at least one bipolar plate; and
   at least one electrode assembly (MEA), opposing a side of the one bipolar plate, wherein the one MEA comprises an electrolyte membrane, an anode, and a cathode, with the anode and cathode being positioned on opposing faces of the electrolyte membrane,
   wherein the one bipolar plate further comprises:

a first fuel flow hole to supply fuel or oxidant to a first fuel channel at an electrode region of the one bipolar plate;

a manifold that fluidly connects the first fuel hole to the first fuel channel, wherein the manifold is covered by a corresponding anode or cathode;

a first groove proximate to a second fuel flow hole of the one bipolar plate not connected to the first fuel channel; and a first sealing member formed in the first groove, and wherein the MEA further comprises a first electrode hole, a second electrode hole and an electrolyte membrane hole corresponding to one of the fuel flow holes in the one bipolar plate, wherein a diameter of the second electrode hole, which does not connect with the fuel channel of the one bipolar plate, is larger than a diameter of the corresponding fuel flow hole, wherein a second sealing member is formed on an inner wall of the second electrode hole, and wherein a sealing member is not formed on an inner wall of the first electrode hole.

10. The direct liquid feed fuel cell of claim 9, further comprising a second bipolar plate on an opposing side of the one MEA, wherein the second bipolar plate further comprises:

a third fuel flow hole, aligned with the second fuel hole, to supply fuel or oxidant to a second fuel channel at an electrode region of the second bipolar plate;

a second groove enclosing a fourth fuel flow hole of the second bipolar plate, aligned with the first fuel hole, and not connected to the second fuel channel; and a third sealing member formed in the second groove.

11. The direct liquid feed fuel cell of claim 10, wherein the one bipolar and the second bipolar plate are forcibly stacked by a fourth sealing member connecting to a third groove in the first bipolar plate enclosing the electrode region of the one bipolar plate and to a fourth groove in the second bipolar plate enclosing the electrode region in the second bipolar plate.

12. The direct liquid feed fuel cell of claim 9, wherein the at least one bipolar plate includes at least two bipolar plates, forcibly stacked to form a direct liquid feed fuel cell stack.

13. The direct liquid feed fuel cell of claim 9, wherein the at least one bipolar plate includes at least two bipolar plates, forcibly stacked to form a direct liquid feed fuel cell stack by linking the one bipolar plate to a second bipolar plate using a fourth sealing member enclosing respective electrode regions of the one bipolar plate and the second bipolar plate.

14. The direct liquid feed fuel cell of claim 13, wherein the fourth sealing member is located in a groove in at least one of the one bipolar plate and the second bipolar plate.

15. The direct liquid feed fuel cell of claim 9, wherein the first groove prevents fuel from the second fuel hole to contact the anode if fuel from the first fuel flow hole contacts the cathode and prevents fuel from the second fuel hole to contact the cathode if fuel from the first fuel hole contacts the anode.

16. The direct liquid feed fuel cell of claim 9, wherein the fuel is methanol or alcohol in the first fuel hole and the oxidant is provided in the second fuel hole.

17. The direct liquid feed fuel cell of claim 9, wherein the one bipolar plate has a thickness less than approximately 2 mm.

18. The direct liquid feed fuel cell of claim 9, wherein multiple bipolar plates are forcibly stacked without use of end plates to keep stacked bipolar plates compressed.

19. A direct liquid feed fuel cell stack, comprising:

a plurality of stacked bipolar plates, having membrane electrode assemblies (MEAs) therebetween, wherein each MEA comprises an electrolyte membrane, an anode, and a cathode, with the anode and cathode on opposing faces of the electrolyte membrane, wherein at least one of the bipolar plates includes fuel flow holes, to supply fuel or oxidant to a corresponding fuel channel in the one bipolar plate, positioned within an electrode region of the one bipolar plate, wherein manifolds in the one bipolar plate connect the fuel flow holes to the corresponding fuel channel, and the manifolds are covered by a corresponding anode or cathode, wherein each MEA further comprises a first electrode hole, a second electrode hole and an electrolyte membrane hole corresponding to one of the fuel flow holes in the one bipolar plate, wherein a diameter of the second electrode hole, which does not connect with fuel channels of the one bipolar plate, is larger than a diameter of the corresponding fuel flow hole, wherein a sealing member is formed on an inner wall of the second electrode hole, and wherein a sealing member is not formed on an inner wall of the first electrode hole.

* * * * *